July 28, 1970     G. A. HANDELAND     3,521,671

METERING APPARATUS

Filed June 16, 1967     2 Sheets-Sheet 1

INVENTOR
GEORGE A. HANDELAND
BY
Zeck, Zarley, McKee & Thomte
ATTORNEYS

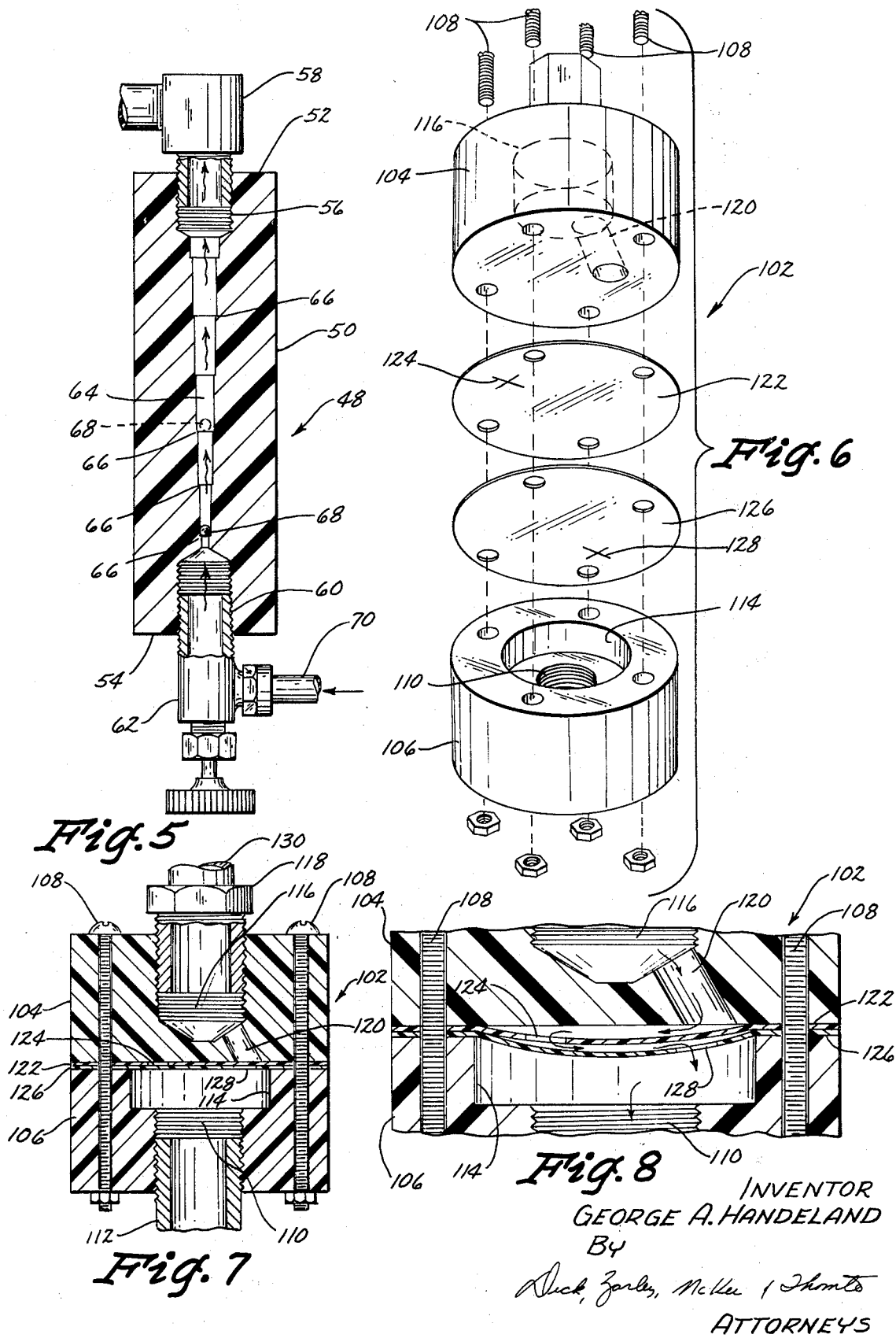

United States Patent Office 3,521,671
Patented July 28, 1970

3,521,671
METERING APPARATUS
George A. Handeland, Ringsted, Iowa 50578
Filed June 16, 1967, Ser. No. 646,601
Int. Cl. E03b 7/07
U.S. Cl. 137—564.5                2 Claims

ABSTRACT OF THE DISCLOSURE

A metering apparatus for selectively metering a predetermined amount of an additive into a liquid. The additive is contained in a flexible bag positioned within a cylinder and the additive is proportionately metered therefrom upon the entry of a predetermined amount of the liquid into the area between the flexible bag and the cylinder.

---

It is a principal object of this invention to provide a metering apparatus which proportionately meters an additive into a liquid supply.

A further object of this invention is to provide a metering apparatus comprised of material which is not subject to corrosion.

A further object of this invention is to provide a metering apparatus including a non-corrosive check valve means.

A further object of this invention is to provide a metering apparatus including a non-plugging visual indicator means which visually indicates the amount of liquid flowing therethrough.

A further object of this invention is to provide a metering apparatus which automatically proportionately meters an additive into a liquid.

A further object of this invention is to provide a metering apparatus including a flexible bag positioned within a cylinder means and a novel means for charging the flexible bag with the additive.

A further object of this invention is to provide a metering apparatus which may be used in a variety of various environments.

A further object of this invention is to provide a metering apparatus which is trouble-free.

A further object of this invention is to provide a metering apparatus which is duable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 5 is a partial sectional view of the visual flow indicator means;

FIG. 6 is an exploded perspective view of the check valve means;

FIG. 7 is a sectional view of the check valve means in a first position;

FIG. 8 is a fragmentary sectional view of the check valve means in a second position.

Figure 1:
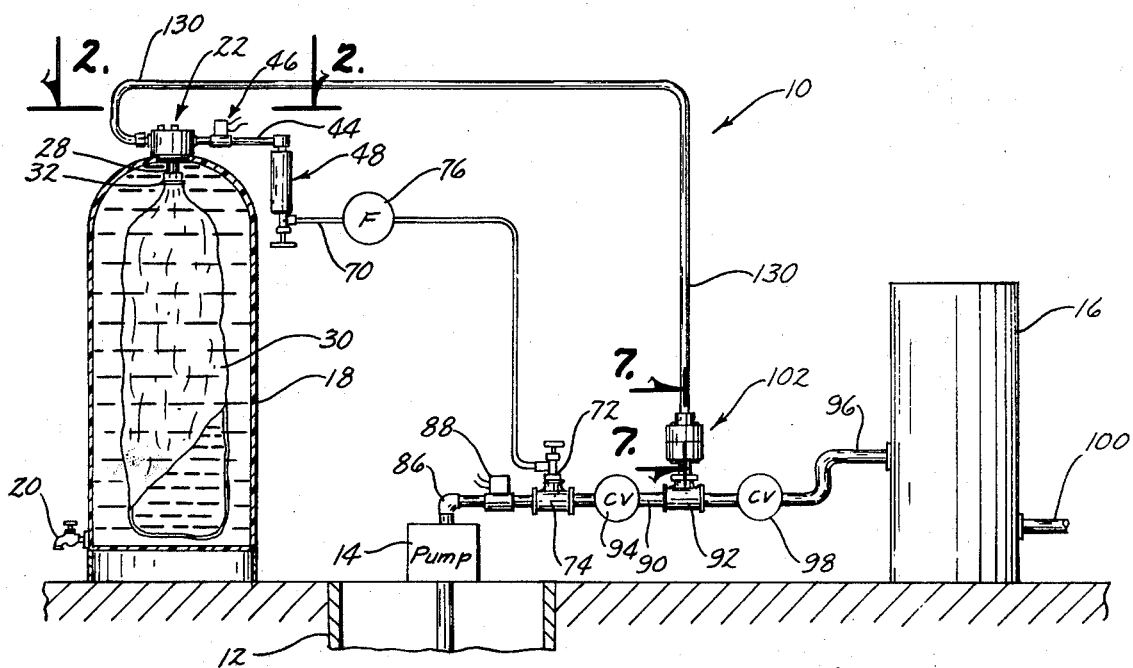
FIG. 1 is a side view of the metering apparatus as it is used in conjunction with a well with portions thereof cut away to more fully illustrate the invention.

The metering apparatus of this invention is generally indicated by the reference numeral 10 and is adapted to proportionately meter an additive into water which is being pumped from well 12 by a pump 14. The numeral 16 generally designates a pressure tank which is common to a large majority of farm and home-owned water supplies. The metering apparatus 10 has been shown in FIG. 1 in a well environment but can also be utilized in any environment wherein it is desired to meter an additive into a liquid supply.

Figures 2, 4:
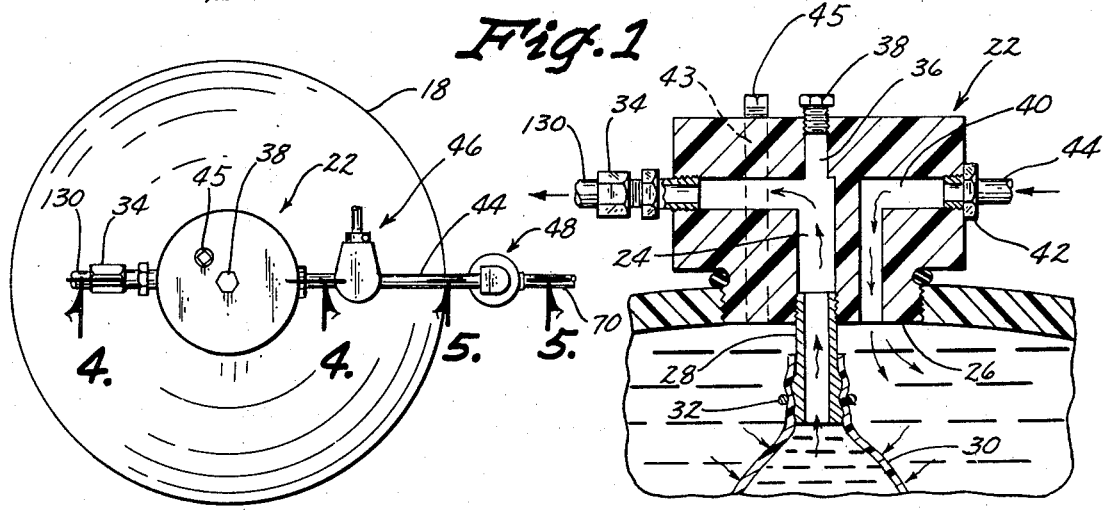
FIG. 2 is an enlarged sectional view as seen on line 2—2 of FIG. 1.
FIG. 4 is an enlarged sectional view as seen on line 4—4 of FIG. 2.
Figures 3, 9:
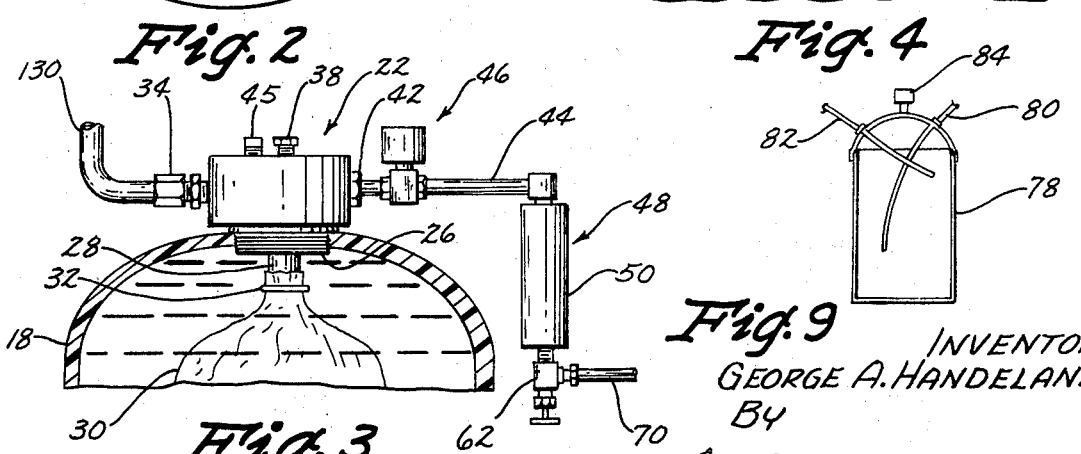
FIG. 3 is a fragmentary side view of a portion of the apparatus.
FIG. 9 is a sectional view on the optional settling tank means.

The numeral 18 designates a vertically disposed hollow cylinder which is preferably constructed of a reinforced glass fiber material. Cylinder 18 is provided with a spigot 20 at the lower end thereof and has a head assembly 22 threadably secured to its upper end. Head assembly 22 is best illustrated in FIGS. 2, 3 and 4 and is preferably constructed of a plastic material.

Head 22 is provided with a bore 24 formed therein which extends vertically upwardly from the bottom 26 thereof and thence horizontally outwardly therefrom. A nipple 28 is threadably received in the lower end of bore 24 and extends downwardly as best illustrated in FIG. 4. A flexible bag 30 preferably constructed of a plastic material is secured at its upper end to nipple 28 by any convenient means such as a clamp 32 so that the interior of bag 30 is in communication with bore 24. A fitting 34 is threadably received in the horizontal portion of bore 24 in the manner illustrated in FIG. 4. Head 22 is also provided with a bore 36 which extends upwardly from bore 24 and which is selectively closed by a plug 38. A bore 40 is also provided in head 22 and as seen in FIG. 4 extends horizontally inwardly from the side thereof and thence vertically downwardly so that bore 40 communicates with the interior of cylinder 18. A fitting 42 is threadably mounted in the outer end of bore 40. Head 22 is also provided with a vertical bore 43 which is selectively closed by plug 45 to permit the interior of cylinder 18 to communicate with the atmosphere at times.

A conduit 44 is secured to fitting 42 and extends horizontally therefrom as illustrated in FIG. 1. A solenoid operated valve 46 is imposed in conduit 44 and will be activated whenever the pump 14 or comparable equipment is activated. The numeral 48 generally designates a flow indicator means and is best illustrated in FIG. 5. Indicator means 48 includes a transparent cylindrical body portion 50 having an upper end 52 and a lower end 54. The upper end of body portion 50 is provided with a threaded bore 56 formed therein having a fitting 58 threadably mounted therein which is connected to conduit 44. The lower end of body portion 50 is provided with a threaded bore 60 formed therein having a needle valve means 62 threadably mounted therein. A bore 64 is formed in body portion 50 and extends from bore 60 to bore 56 as illustrated in FIG. 5. As seen in FIG. 5, the diameter of bore 64 increases from the lower end to the upper end thereof and these diameter increases are accomplished by a plurality of stages 66. A ball 68 is movably mounted in bore 64 and will engage the lowermost stage 66 when the unit is not operating as viewed in FIG. 5.

Needle valve means 62 is connected to a conduit 70 which extends therefrom to a drive unit 72. Drive unit 72 is merely a needle valve means 72 which is threadably secured to a T 74 and is adapted to be selectively operated to permit the flow of liquid from T 74 into conduit 70. The numeral 76 designates an optional filter which is imposed in conduit 70. Filter 76 is merely intended to filter foreign particles or the like from the liquid flowing through conduit 70. An example of a filter which may be used in conduit 70 is best seen in FIG. 9 wherein the numeral 78 generally designates a vertically disposed cylinder means having an inlet conduit 80 and a discharge conduit 82. A conventional air relief valve 84 is provided at the upper end of cylinder 78 and is adapted to permit the passage of air from the interior of cylinder 78 to the atmosphere. The lower end of inlet conduit 80 is positioned below the lower end of discharge conduit 82 which causes the foreign materials in the liquid to be separated therefrom due to the fact that the liquid is caused to reverse its direction of travel. Additionally, any air that is entrained in the liquid will pass to the upper end of the cylinder means 78 and will escape therefrom via valve 84.

The numeral 86 designates a conduit extending from pump 14 to T 74. The numeral 88 generally designates an optional solenoid operated valve which is designed to permit the flow of liquid therethrough at times in certain environments. A conduit 90 extends from T 74 to a T 92 and an optional check valve 94 may be imposed in conduit 90 to permit the flow of liquid from T 74 to T 92 while at the same time preventing the flow of liquid from T 92 to T 74. If desired, check valve 94 may be substituted with a conventional gate valve. A conduit 96 connects T 92 with the pressure tank 16 and an optional check valve 98 may be imposed therein to prevent the flow of liquid from tank 16 to T 92 while at the same time permitting liquid to flow from T 92 to tank 16. A conduit 100 extends from tank 16 to the point of use.

The numeral 102 generally designates a diaphragm check valve which is best illustrated in FIGS. 6, 7 and 8. Valve 102 includes an upper body portion 104 and a lower body portion 106 which are detachably secured together by a plurality of bolt members 108 extending through suitable openings formed therein. Lower body portion 106 is provided with a bore 110 extending upwardly from the bottom end thereof and which is adapted to threadably receive a nipple 112 therein as best illustrated in FIG. 7. Body portion 106 is provided with a well portion 114 which is formed in the upper end thereof and which is in communication with bore 110 as more clearly illustrated in FIG. 6. Upper body portion 104 is provided with a central bore 116 formed therein having a fitting 118 threadably received thereon. As seen in FIGS. 7 and 8, the lower end of bore 116 as in communication with a bore 120 which extends downwardly and outwardly therefrom through the bottom thereof. As seen in FIG. 8, the lower end of bore 120 is positioned inwardly of the wall surface of well 114.

The numeral 122 designates a flexible diaphragm preferably constructed of a plastic material which is positioned immediately below the bottom of upper body portion 104 and which is provided with a slit opening 124 formed therein. The numeral 126 designates a flexible diaphragm preferably constructed of a plastic material which is positioned immediately below diaphragm 122 and which is provided with a slit opening 128 formed therein. Slit openings 124 and 128 in diaphragms 122 and 126 are positioned substantially opposite each other and are positioned over well 114 as seen in FIG. 8. Preferably, diaphragm 122 is constructed of a material having a slightly greater thickness than diaphragm 126. Diaphragms 122 and 126 are provided with suitable openings formed therein through which the bolt members 108 extend. The bolt members 108 draw the body portions 104 and 106 together thereby creating a seal between the respective peripheral edges thereof. As seen in FIG. 1, a conduit 130 is secured to fitting 118 and extends to fitting 34 on head 22.

The operation of the apparatus will be described for the environment seen in FIG. 1 but it should be noted that the apparatus is equally well suited for other environments. The apparatus seen in FIG. 1 is designed to permit the purification of the well water being pumped from well 12 to the point of use. Heretofore, it was not feasible or efficient to purify the water with chlorine due to the difficulty in correctly adding the same to the water. A further difficulty encountered with the addition of chlorine to water is the detrimental and damaging effects that the chlorine has on metal components of the available systems. However, the apparatus disclosed herein permits the use of chlorine and this use is described as follows. Initially, cylinder 18 is empty and head apparatus 22 will be removed therefrom so that the empty bag 30 may be secured to nipple 28 by clamp 32. Head 22 is then reinstalled on cylinder 18 and bag 30 is positioned within cylinder 18. Cylinder 18 is then filled with water by activating the pump 14 so that water will pass through needle valve 72, conduit 70, indicator means 48 and conduit 44. Plugs 38 and 45 are removed from head 22 during the time the water is being pumped into cylinder 18 so that the air contained within cylinder 18 and bag 30 may be forced therefrom through the respective bores associated therewith. Obviously, pump 14 would be de-energized when the cylinder 18 is full. When cylinder 18 is full, bag 30 will be empty and will be compressed by the water contained within cylinder 18.

Conduit 130 is then disengaged from check valve 102 and the free end thereof will then be placed in communication with a source of chlorine which is preferably at a level slightly above the upper end of cylinder 18. Plugs 38 and 45 are then reinstalled in head 22 and spigot 20 is then opened to permit the water in cylinder 18 to escape therethrough. The water draining from cylinder 18 causes a partial vacuum therein which causes the chlorine to be drawn from its container into conduit 130, bore 24, nipple 28 and into the interior of bag 30. When the water has been completely drained from cylinder 18, bag 30 will be full and will completely occupy the interior of cylinder 18 at which time spigot 20 is closed and conduit 130 is again attached to check valve 102. The apparatus is then charged and is ready to proportionately meter the chlorine into the water as it is being pumped from well 12 to the point of use. As previously stated, valve 46 will be opened when pump 14 is activated to permit the flow of fluid therethrough. When pump 14 is activated, needle valve 72 directs a quantity of the water being pumped through conduit 86 through conduit 70, indicator means 48, conduit 44, valve 46, bore 40 and into the interior of cylinder 18 between the inside wall thereof and bag 30. The fact that water is being forced into the interior of cylinder 18 will cause bag 30 to be compressed in a volume equal to the volume of the water entering cylinder 18 thereby causing the chlorine within bag 30 to be forced outwardly through nipple 28, bore 24, conduit 130, check valve 102, T 92 and into conduit 96. Thus, if one gallon of water is forced into the interior of cylinder 18, one gallon of chlorine will also be forced from bag 30 into the water supply.

Indicator means 48 provides a visual indication of the amount of water that is flowing therethrough. The operator of the apparatus will necessarily determine the amount of chlorine that is necessary to properly purify the water in conventional fashion and needle valve 62 on indicator means 48 will be opened or closed to permit more or less water to flow therethrough which obviously controls the amount of chlorine that will be metered into the liquid. The flow of water through bore 64 in indicator means 48 will cause the ball 68 to raise from the lowermost stage 66 to one of the stages thereabove depending upon the amount of water flowing therethrough. Thus, ball 68 will be positioned at various stages 66 deepnding upon the amount that needle valve means 62 is opened. The operator must determine by testing the purity of the water exactly the amount that needle valve means 62 must be opened. For example, if the needle valve 62 has been opened a certain amount and the operator determines that this amount satisfactorily purifies the water, he will note the position of the ball 68 in relation to the various stages. For example, if the water is being properly purified when the ball 68 is positioned at a particular stage 66, the operator will know that the water will not be properly purified if the ball 68 is not at that particular position during the operation of the apparatus. The position of ball 68 provides the operator with a means for visually determining the amount of chlorine that is being added to the water. If a piece of foreign material should enter bore 64, the ball 68 will simply rise to a higher stage 66 thereby permitting the foreign material to flow therepast at which time the ball 68 will again return to its proper position. When ball 68 is in its lowermost position as illustrated in FIG. 5, the ball acts as a ball valve and prevents the flow of liquid from bore 64 into conduit 70.

The check valve 102 serves to prevent the flow of liquid upwardly therethrough while permitting the flow of liquid downwardly therethrough and because it is plastic construction will not be damaged by the chlorine passing therethrough. FIG. 8 illustrates the relationship of the diaphragm when liquid is being supplied therethrough by way of conduit 130. The chlorine enters bore 116 and thence downwardly and outwardly through bore 120. The chlorine is deposited on the upper surface of diaphragm 122 and passes laterally therealong until it reaches slit opening 124. The chlorine passes through diaphragm 122 by means of slit opening 124 and thence passes laterally along the upper surface of diaphragm 126 until it passes therethrough by means of slit opening 128. The chlorine then passes outwardly of the check valve 102 into nipple 112. FIG. 7 illustrates the relationship of the diaphragms when pressure is supplied to the bottom of diaphragm 126. Pressure against diaphragm 126 causes diaphragms 122 and 126 to be moved upwardly into engagement with the bottom portion of body member 104. When the diaphragms 122 and 126 are in the position of FIG. 7, the liquid being forced upwardly thereagainst cannot pass therethrough inasmuch as slit opening 128 is sealed against diaphragm 122 and inasmuch as slit opening 124 is sealed against diaphragm 126 and the lower end of body member 104. Likewise, the lower end of bore 20 is sealed by diaphragm 122 being forced thereagainst. Thus, the flexible diaphragms may be deflected downwardly as seen in FIG. 8 to permit the flow of fluid therethrough in one direction but will be forced upwardly into sealing engagement with body portion 104 to prevent the flow of liquid therethrough in a second direction. The diaphragms 122 and 126 may be easily replaced when worn and will not be subject to the corrosive characteristics of the chlorine due to the plastic construction thereof. Check valve 102 serves to prevent the flow of water into the chlorine supply in this environment but it can be appreciated that the construction thereof permits its use in any type of environment where corrosive liquids are being used.

The solenoid operated valve 80 is an optional unit and is designed to stop or start the flow of fluid therethrough depending upon the particular environment in which the apparatus is being used. Additionally, the check valves 94 and 98 are also optional structure which may or may not be used depending upon the environment in which the apparatus is being used. The pressure tank 16 should be used when the apparatus is being used in conjunction with a city water supply. Solenoid operated valve 46 is not needed when the flow of liquid therethrough is continuous and a mechanical check valve will work in some installations.

Thus it can be seen that a unique apparatus has been described which permits the automatic proportionate metering of an additive into a liquid supply. The construction of the apparatus is such that it will not be damaged by the corrosive characteristics of the additive and thus provides a substantially trouble-free operation.

Thus it can be seen that the device accomplishes at least all of its stated objectives.

I claim:
1. In a metering apparatus;
   a hollow container means having upper and lower ends, said container means having an opening formed in its upper end having a diameter less than the diameter of said container means,
   a head assembly removably secured in and closing said container means opening, said head assembly having a first bore formed therein extending between the interior of said container means and a first conduit connected to said head assembly,
   a second conduit extending from a liquid source under pressure to a point of use, said first conduit being connected to said second conduit,
   said head assembly having a second bore formed therein extending between the interior of said container means and a third conduit connected to said head assembly,
   said third conduit being connected to said second conduit between said liquid source and the connection of said first and second conduits,
   a flexible bag means in said container means adapted to contain an additive therein and having its upper end operatively connected to said first bore in said head assembly,
   and a valve means in said third conduit adapted to cause a predetermined amount of liquid to enter said container means through said second bore formed in said head assembly and between said flexible bag means and said container means thereby compressing said bag means to force a predetermined amount of the additive from said bag means into said first bore and said first conduit and thence into said second conduit,
   said container means having a manually operated valve means at its lower end adapted to permit the liquid to flow from said container means at times, said head assembly having a third bore formed therein which is in communication with said first bore and the atmosphere, said third bore being closable by a first plug means secured therein, said head assembly having a fourth bore formed therein placing the interior of said container means in communication with the atmosphere at times, said fourth bore being closable by a second plug means secured therein, said second, third and fourth bores and said manually operated valve means permitting said flexible bag means to be filled with said additive while being positioned in said container means.

2. The apparatus of claim 1 wherein a nipple means is mounted in said first bore and extends downwardly therefrom, the upper end of said bag means being secured to said nipple means to place the interior of said bag means in communication with said first bore.

References Cited

UNITED STATES PATENTS

| 1,714,300 | 5/1929  | Denney   | 137—546     |
| 2,960,999 | 11/1960 | Lacy     | 137—564.5   |
| 3,416,371 | 12/1968 | Locke    | 73—209      |
| 2,869,926 | 1/1959  | Lundquist | 137—205.5 X |
| 3,166,096 | 1/1965  | Lang     | 137—564.5   |
| 3,194,254 | 7/1965  | Zmek     | 137—559     |

FOREIGN PATENTS 1,023,597   1/1958   Germany.

M. CARY NELSON, Primary Examiner
W. R. CLINE, Assistant Examiner